2,885,398
17α-ALKYLTESTOSTERONE DERIVATIVES

Percy L. Julian, Oak Park, and Helen C. Printy, Chicago, Ill., assignors to The Julian Laboratories, Inc., Franklin Park, Ill., a corporation of Illinois No Drawing. Application December 19, 1957
Serial No. 703,745

3 Claims. (Cl. 260—239.55)

This invention relates to novel 4,5-epoxy derivatives of 17α-alkyltestosterones.

The 17α-alkyl-4,5-epoxytestosterone analogues of this invention are of utility because of their value as intermediates used in preparing 4-halo derivatives which have outstanding anabolic-androgenic ratios. Furthermore, these 17α-alkyl-4,5-epoxytestosterone analogues have anabolic-androgenic activity.

The compounds of this invention are represented by the following structural formula:

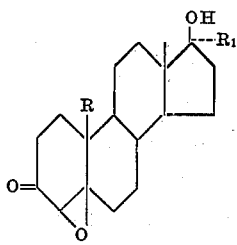

in which: R represents hydrogen or methyl, and $R_1$ represents methyl or ethyl.

Organic esters of the above compounds, such as, for example, the acetate, benzoate and cyclopentylpropionate are also included within the scope of this invention.

The epoxy derivatives of 17α-alkyltestosterone which are the object of this invention are prepared by treating the known 3-keto-Δ⁴-steroid starting materials with an aqueous alkaline hydrogen peroxide solution in a water-miscible solvent. This reaction is shown in the following scheme in which R and $R_1$ are as given above:

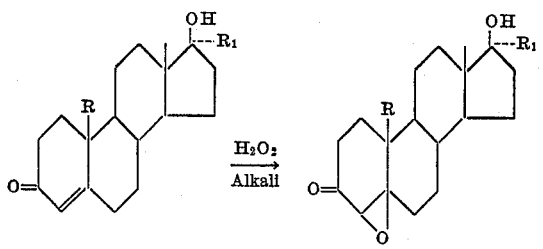

The following testosterones are exemplary of the starting materials; 17α-methyltestosterone, 17α-methyl-19-nortestosterone and 17α-ethyl-19-nortestosterone.

The alkali used may be any alkali metal hydroxide or carbonate such as, for example, sodium hydroxide, potassium hydroxide, sodium carbonate or potassium carbonate.

The water miscible solvent may be, for example, a lower aliphatic alcohol such as methanol or ethanol, a ketone solvent such as acetone and methyl ethyl ketone or dioxane. By way of further example solvent mixtures such as benzene or a chlorinated methane such as chloroform, carbon tetrachloride or methylene chloride in admixture with a major proportion of a lower aliphatic alcohol such as methanol or ethanol are satisfactory.

The reaction will be carried out at a low temperature, preferably from about −20° C. to about 30° C. and advantageously from about −20° C. to +10° C.

The reaction is preferably carried out until the major proportion of the starting material has been epoxidized. Advantageously the course of the reaction will be checked spectrophotometrically and the reaction mixture quenched preferably with cold water immediately after the disappearance of unsaturation in ring A, which is indicated by the disappearance of the characteristic α,β-unsaturated ketone absorption in the 238 mμ–242 mμ region. The quenching at this stage of the reaction insures the avoidance of further undesired oxidation to acidic products. The desired 4,5-epoxy compounds are obtained by filtration or by solvent extraction.

The 4α,5α epoxide and the 4β,5β epoxide isomers can be separated by hand or, alternatively by using conventional fractional crystallization techniques. Because of the unique inclusion of the stereo-sensitive 4,5-positions of the steroid nucleus in these epoxides, the usual rules for predicting configuration or conformation of oxides cannot be applied to these compounds.

The compounds of this invention have utility as intermediates for the preparation of 4-substituted-testosterone, preferably the 4-halogen-testosterones of the following structure.

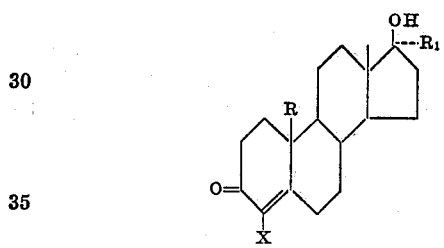

in which R and $R_1$ are as given above and X is halogen, preferably chlorine or bromine. These 4-halogen-testosterones have outstanding activity as anabolic agents with a remarkably low level of androgenic effects.

The epoxy compounds of this invention are used to form the above 4-halogen-17α-alkyltestosterones by reacting them with a hydrogen halide such as, for example, hydrogen bromide or hydrogen chloride in acetic acid as shown in the following scheme:

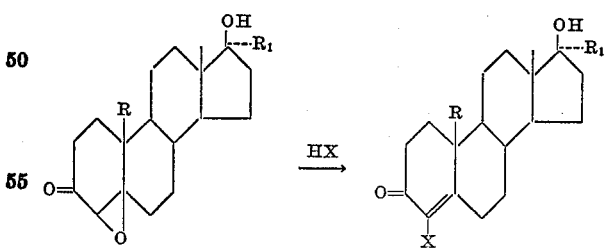

The reaction is advantageously carried out at room temperature and the resulting halogen derivatives are obtained by diluting the mixture with water.

The epoxy intermediates are of value in this reaction because of the unusual stability of the 17-β hydroxy moiety. The reaction proceeds with formation of a halohydrin at the 4,5-position followed by dehydration under acid conditions at the 4,5-position. As those skilled in the art will recognize, the 17-hydroxy moiety of 17α-alkyltestosterones is lost under acid conditions by dehydration followed by rearrangement of the double bond. The 17-hydroxy moiety of testosterone is stable under like acid conditions. Therefore the compounds of this invention have unexpected stability toward dehydration at the 17-position while dehydration occurs at the 5-position.

It will be understood that in the epoxide structures noted above and in the claims, the bonds indicated by the solid lines in the 4,5-positions represent both the alpha and beta epoxides or mixtures thereof. Although the epoxide isomers can be separated if desired, it is usually the practice to use the crude mixture as the intermediate for further reaction.

This invention will be further clarified by the following examples.

*Example 1*

Ten grams of 17α-methyltestosterone is treated in methanol with 20 ml. of 5N sodium hydroxide and 50 ml. of 30% hydrogen peroxide at 5° C. The reaction mixture is kept at 5° C. for 90 minutes at which time the ultraviolet absorption at 241 mµ indicated 90% epoxidation. The solution is poured into 1500 ml. of ice water. The precipitated epoxide is collected by filtration. This material (11.0 g.) is recrystallized from ether-petroleum ether to yield 6.8 g. of 4,5-epoxy-17α-methyltestosterone, M.P. 126–174° C. Recrystallization from acetone separates two isomeric epoxides, M.P. 180–182° C. and M.P. 130° C.

By a procedure analogous to that described above, substitution of molar equivalent amounts of 17α-ethyl-19-nortestosterone results in 4,5-epoxy-17α-ethyl-19-nortestosterone, 17α-methyl-19-nortestosterone cyclopentylpropionate yields 4,5-epoxy-17α-methyl-19-nortestosterone cyclopentylpropionate, 17α-ethyltestosterone yields 4,5-epoxy-17α-ethyltestosterone, 17α-methyl-19-nortestosterone yields 4,5-epoxy-17α-methyl-19-nortestosterone, 17α-methyl-19-nortestosterone benzoate yields 4,5-epoxy-17α-methyl-19-nortestosterone benzoate.

*Example 2*

A solution of 4.0 g. of the mixture of 4,5-epoxy-17α-methyltestosterones of Example 1 in 50 ml. of glacial acetic acid is cooled in an ice bath. A saturated solution of hydrogen bromide in glacial acetic acid is added. The mixture is allowed to come to room temperature and stand for 24 hours with occasional swirling. The desired 4-bromo-17α-methyltestosterone is isolated by quenching in water, filtering and washing well with water. A characteristic unsaturated ketone absorption on the crude product is observed spectrophotometrically.

Analogously, by treatment of other novel epoxy derivatives with saturated solutions of hydrogen halides in glacial acetic acid, methanol or a mixture of chloroform and ethanol or methanol, the corresponding 4-halogen derivatives are obtained, for example, 4,5-epoxy-17α-ethyl-19-nortestosterone yields on treatment with hydrogen bromide 4-bromo-17α-ethyl-19-nortestosterone, 4,5-epoxy-17α-methyl-19 - nortestosterone cyclopentylpropionate on treatment with hydrogen chloride yields 4-chloro-17α-methyl-19-nortestosterone cyclopentylpropionate, 4,5-epoxy-17α-ethyltestosterone yields on reaction with hydrogen chloride 4-chloro-17α-ethyltestosterone, 4,5-epoxy-17α-methyl-19-nortestosterone on treatment with hydrogen chloride gives 4-chloro-17α-methyl-19-nortestosterone, and 17α-methyl-19-nortestosterone benzoate on reaction with hydrogen fluoride yields 4-fluoro-17α-methyl-19-nortestosterone benzoate.

This application is a continuation-in-part of application Serial No. 486,014, filed February 3, 1955, now abandoned.

We claim:

1. A compound having the basic structural formula

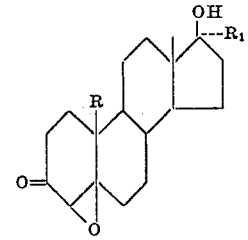

in which R is a member selected from the group consisting of hydrogen and methyl and $R_1$ is a member selected from the group consisting of methyl and ethyl.

2. 4,5-epoxy-17α-methyltestosterone.

3. 4,5-epoxy-17α-ethyltestosterone.

No references cited.